US012395802B2

(12) United States Patent
Johansen et al.

(10) Patent No.: US 12,395,802 B2
(45) Date of Patent: *Aug. 19, 2025

(54) HEARING DEVICE AND EARPIECE WITH ACTIVE VENT

(71) Applicant: GN Hearing A/S, Ballerup (DK)

(72) Inventors: Jan Johansen, Køge (DK); Timea Denisa Merca, Køge (DK); Maria Chantziara, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 38 days.

This patent is subject to a terminal disclaimer.

(21) Appl. No.: 18/325,978

(22) Filed: May 30, 2023

(65) Prior Publication Data

US 2023/0300548 A1 Sep. 21, 2023

Related U.S. Application Data

(63) Continuation of application No. 17/528,181, filed on Nov. 16, 2021, now Pat. No. 11,770,663.

(30) Foreign Application Priority Data

Nov. 30, 2020 (DK) .......................... PA 2020 70804

(51) Int. Cl.
*H04R 25/00* (2006.01)

(52) U.S. Cl.
CPC .......... *H04R 25/65* (2013.01); *H04R 2460/11* (2013.01)

(58) Field of Classification Search
CPC ........ H04R 25/00; H04R 25/60; H04R 25/65; H04R 2460/11
See application file for complete search history.

(56) References Cited

U.S. PATENT DOCUMENTS 4,852,177 A 7/1989 Ambrose
6,354,990 B1 3/2002 Juneau et al.
10,567,891 B1 2/2020 Stewart et al.
2009/0310807 A1 12/2009 Van Halteren
2019/0208343 A1 7/2019 Monti et al.
2019/0215620 A1 7/2019 Albahri et al.

FOREIGN PATENT DOCUMENTS

EP 3627848 3/2020
EP 3716649 9/2020
WO WO 00/76271 12/2000

OTHER PUBLICATIONS

Non-Final Office Action for U.S. Appl. No. 17/528,181 dated Nov. 18, 2023.
Amendment Response to NFOA for U.S. Appl. No. 17/528,181 dated Feb. 13, 2023.
Notice of Allowance for U.S. Appl. No. 17/528,181 dated May 18, 2023.
Foreign 1st Technical Examination Report for Danish Patent Appln. No. PA 2020 70804 dated Mar. 1, 2021.

*Primary Examiner* — Suhan Ni
(74) *Attorney, Agent, or Firm* — Vista IP Law Group, LLP

(57) ABSTRACT

An earpiece of hearing device for insertion into an ear canal of a user and having a longitudinal axis, the earpiece includes an earpiece housing having a distal end, a proximal end, and an outer surface connecting the distal end to the proximal end, a receiver comprising a receiver housing, the receiver located within the earpiece housing, and a vent mechanism arranged in the earpiece housing, wherein the vent mechanism is arranged distal to the receiver.

25 Claims, 5 Drawing Sheets

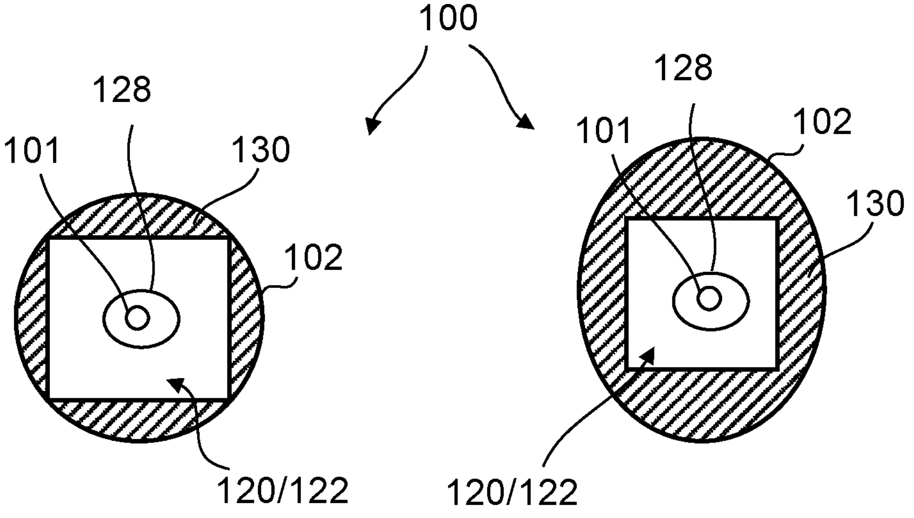
Fig. 2A
Fig. 2B
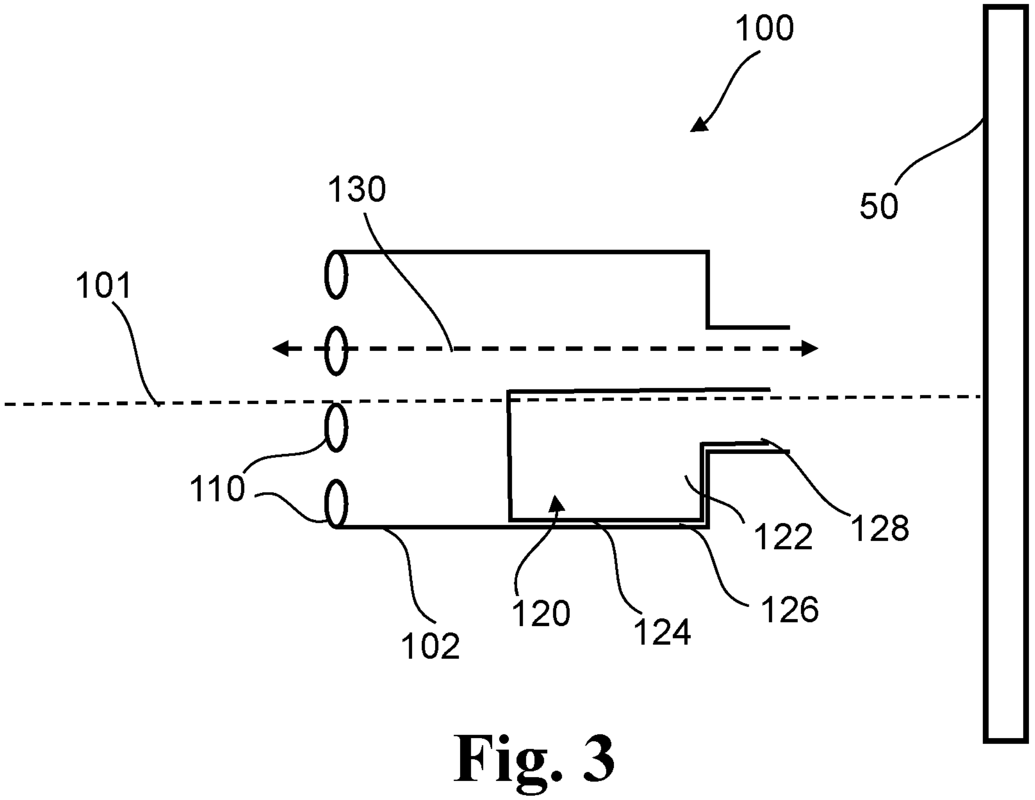
Fig. 3

HEARING DEVICE AND EARPIECE WITH ACTIVE VENT

RELATED APPLICATION DATA

This application is a continuation of U.S. patent application Ser. No. 17/528,181 filed on Nov. 16, 2021, pending, which claims priority to, and the benefit of, Danish Patent Application No. PA 2020 70804 filed on Nov. 30, 2020. The entire disclosures of the above applications are expressly incorporated by reference herein.

FIELD

The present disclosure relates to a hearing device and related methods including a method of operating a hearing device.

BACKGROUND

Earpieces are used in a large variety of situations, where an audio signal is presented to the user via the earpiece. Further, earpieces are used in communication systems for presenting to and/or receiving audio signals from the user.

In two-part hearing devices with an earpiece and an external device, the earpiece is connected to the external device by a cable comprising one or more wires and/or a sound guiding channel.

Earpieces for hearing devices are typically worn for many hours and therefore wearing comfort is of key importance for a hearing device user, especially with the varying ear canal sizes of different users.

SUMMARY

Accordingly, there is a need for hearing devices/earpieces and methods with improved fit and sound clarity.

An earpiece of hearing device for insertion into an ear canal of a user and having a longitudinal axis is disclosed, the earpiece comprising an earpiece housing having a distal end, a proximal end, and an outer surface connecting the distal end to the proximal end; a receiver comprising a receiver housing, the receiver located within the earpiece housing; and a vent mechanism arranged in the earpiece housing, wherein the vent mechanism is arranged distal to the receiver.

Also, a hearing device comprising an earpiece as disclosed herein is provided.

It is an important advantage of the hearing device that the hearing device can be of a desirable and comfortable size for the user. In one or more variations of the disclosed hearing device, by moving a venting system distally, the dimensions of the hearing device, at least with respect to different components, can be reduced. This can allow for ease of fit with a user, especially those with smaller ear canals where a full-sized device may not properly fit. Further, the reduction in size can allow for the hearing device to be inserted deeper into a user's ear canal, which allows for less of the device to extend from the ear. As the hearing device is less visible, this can greatly improve aesthetics of using the earpiece.

As mentioned, the reduction in size can improve the fit for user's with small ear canals. Previous hearing device solutions may not fit properly in small ear canals, or may extend too far outwards from the ear to make a user not want to wear. In one or more variations of the disclosed hearing device, the device may be more accommodating to those users with smaller ear canals, providing a significant improvement for those users.

Further, it is an important advantage of the hearing device that the hearing device can be operated for different sound quality over the spectrum of sounds, whether they are received external the ear (such as environmental sound), or inside the ear (such as music playback). Internal and external sound can have its own specific technical problems and solutions, and it can be advantageous for a hearing device to switch between the different types of sound. In one or more variations of the disclosed hearing device, the hearing device can provide advantageous solutions for the two types of audio.

In addition, it can be advantageous to have improved sound quality for deeper sounds, like bass, during inside the ear audio. Other tonal ranges can need improvement as well during the use of a hearing device. In one or more variations of the disclosed hearing device, the hearing device can provide for the improved sound quality at different audio tone ranges.

Thus, one or more exemplary hearing devices of the present disclosure allows for improved sizing and/or improved sound clarity.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which:

FIGS. 2A-2B illustrate flow paths of exemplary hearing devices,

FIG. 3 schematically illustrates internal positioning of components of an exemplary hearing device, FIG. 4 schematically illustrates an exemplary hearing device.

DETAILED DESCRIPTION

Figure 1A:
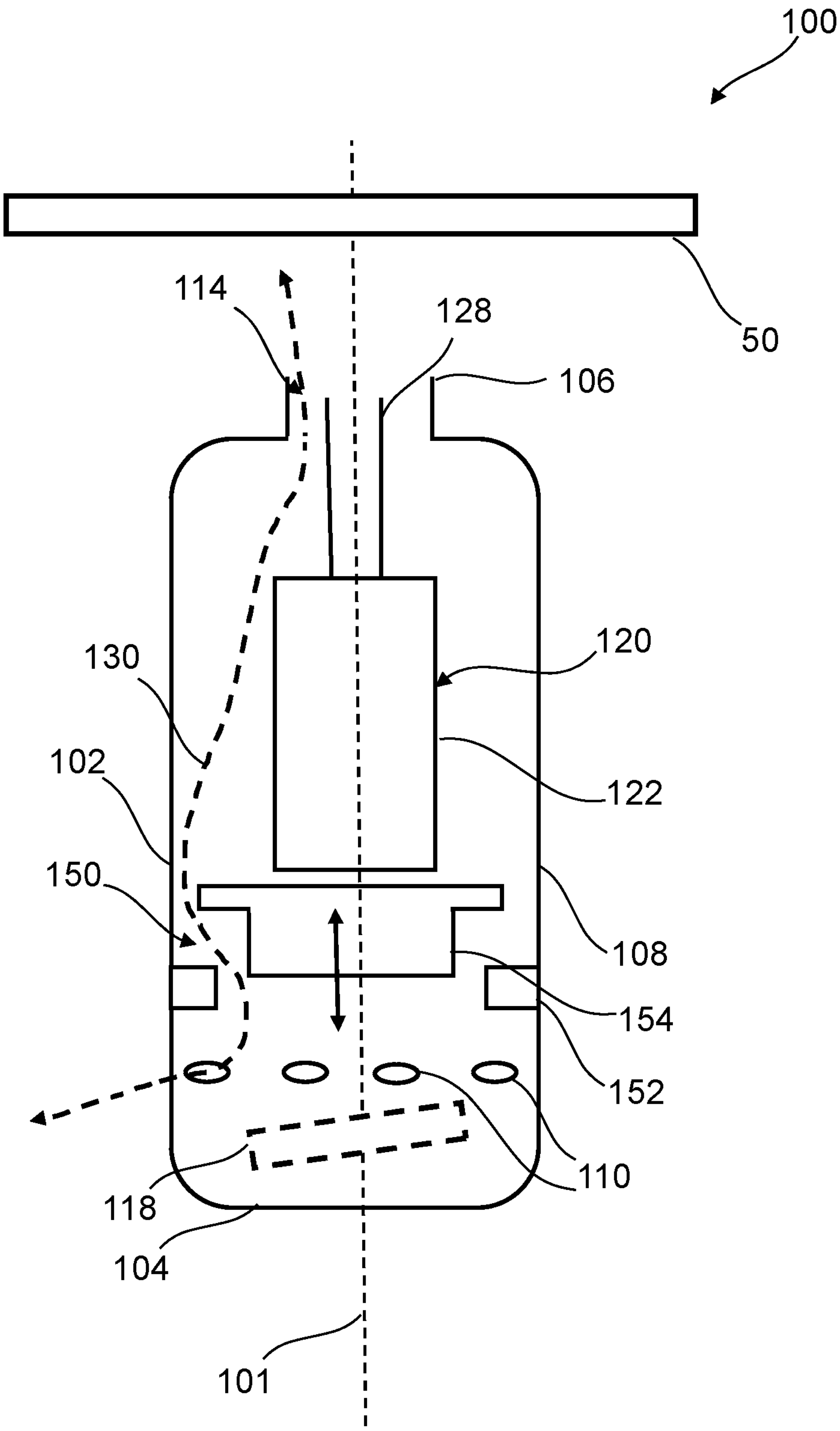
FIGS. 1A-1B schematically illustrates exemplary hearing devices.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid, wherein the processor is configured to compensate for a hearing loss of a user. The hearing device may be of the behind-the-ear (BTE) type, in-the-ear (ITE) type, in-the-canal (ITC) type, receiver-in-canal (RIC) type, receiver-in-the-ear (RITE) type, and/or microphone-and-receiver-in-ear (MaRie) type.

Specifically, an earpiece for a hearing device is disclosed. The earpiece may be configured to be worn at least partially within an ear canal of a user and may be a hearable or a hearing aid, wherein the processor is configured to compensate for a hearing loss of a user.

As discussed herein, the proximal end can herein be seen as the end closest to an ear drum of the user when the earpiece is inserted into the ear of the user. The distal end of the earpiece can herein be seen as the end furthest away from an ear drum of the user when the earpiece is inserted into the ear of the user.

In one or more exemplary earpieces for the hearing device, such as the first earpiece and/or the second earpiece, the earpiece may be configured for insertion at least partially into an ear canal of a user. The earpiece can include a longitudinal axis extending along a length of the earpiece. The longitudinal axis can extend from a distal end to a proximal end.

In one or more exemplary earpieces, the earpiece can include an earpiece housing. The earpiece housing may contain one or more components of the earpiece, such as electronic and/or processing and/or audio and/or data components discussed herein. An electronic connector, such as one or more wires, can extend from the earpiece to one or more other components of the hearing device outside of the ear canal, such as the behind-the-ear type hearing device. In alternative variations, the earpiece may be wirelessly connected to one or more other components outside of the ear canal.

The earpiece housing can have a proximal end (e.g., surface, portion, section, component). The earpiece housing can have a distal end (e.g., surface, portion, section, component). The earpiece housing can have an outer surface (e.g., surface, portion, section, component). The outer surface can connect the distal end to the proximal end. In one or more exemplary earpieces, the distal end and/or proximal end and/or connecting surface may be integrally formed. Alternatively, they may be separate components attached to one another, such as through mechanical or chemical attachment. The earpiece housing may be metal and/or plastic. The earpiece housing may be flexible. The earpiece housing may be rigid. The proximal end may have a sound outlet, or an outlet for sound to direct sound to a user's ear drum. The distal end may include an aperture (e.g., hole, empty space, opening, gap) for receiving a wire connected to another component of the hearing device. The distal end may not have an aperture.

In one or more exemplary earpieces, the outer surface may extend (or generally extend) along the longitudinal axis of the earpiece. In alternative earpieces, the outer surface may extend at an angle from the longitudinal axis of the earpiece. In some earpieces, the outer surface may include a number of components extending towards and/or away and/or along the longitudinal axis of the earpiece. Thus, the outer surface may have a regular or irregular surface. The outer surface can extend around an entire circumference of the earpiece housing. The outer surface can be any outer surface of the earpiece housing outside of the proximal end and the distal end. The outer surface may include ridges and/or gaps and/or slots and/or mating features. For example, the outer surface may mate with one or more of the domes as discussed herein.

The earpiece housing may have tabs and/or extensions and/or cavities and/or receiving surfaces and/or attaching surfaces and/or mating surfaces on an inner surface of the earpiece housing (such as on an inner surface of the proximal end and/or distal end and/or outer surface) for connecting the earpiece housing to further components of the earpiece and/or hearing device. The earpiece housing may have tabs and/or extensions and/or cavities and/or receiving surfaces and/or attaching surfaces and/or mating surfaces on an outer surface of the earpiece housing (such as on an outer surface of the proximal end and/or distal end and/or outer surface) for connecting the earpiece housing to further components of the earpiece and/or hearing device. For example, the earpiece housing may mate with one or more of the domes as discussed herein. Further, earpiece housing may include other components, such as a sound tube.

The earpiece housing may have electrical connections on an inner surface of the earpiece housing (such as on an inner surface of the proximal end and/or distal end and/or outer surface) for electrically connecting the earpiece housing to further components of the earpiece and/or hearing device. The earpiece housing may have electrical connections on an outer surface of the earpiece housing (such as on an outer surface of the proximal end and/or distal end and/or outer surface) for electrically connecting the earpiece housing to further components of the earpiece and/or hearing device.

The earpiece housing may contain one or more computer components for operating the earpiece. For example, power storage components and/or one or more processors and/or one or more microchips and/or one or more digital signal processors and/or circuit boards and/or wiring may be partially or fully contained within the earpiece housing.

In one or more exemplary earpieces, the earpiece housing may have a circular (or generally circular or substantially circular) cross section perpendicular to the longitudinal axis. In one or more exemplary earpieces, the earpiece housing may have an ovaloid (or generally ovaloid or substantially ovaloid) cross section perpendicular to the longitudinal axis. In one or more exemplary earpieces, the earpiece housing may have a rectangular (or generally rectangular or substantially rectangular) cross section perpendicular to the longitudinal axis. If a rectangular cross section is used, the cross section may include rounded corners or alternatively sharp corners. The cross section perpendicular to the longitudinal axis may have other polygonal shapes (symmetrical or asymmetrical) as well, and the particular cross-sectional shape of the earpiece housing is not limiting. Further, the cross section may vary in shape and/or dimensions along a longitudinal length of the earpiece, such as discussed below.

In one or more exemplary earpieces, the earpiece may include a receiver. The receiver may include a (receiver) membrane. The receiver can have a receiver housing. The receiver and/or receiver housing may be fully or partially within the earpiece housing. The receiver may be electrically connected to one or more components in the hearing device, including the earpiece. The receiver and/or receiver housing may include a spout extending from the receiver housing. The spout may provide fluid communication between the receiver housing and outside of the earpiece housing. The spout may extend generally proximally from the receiver and/or receiver housing. The spout may remain within the earpiece housing. The spout may extend proximally beyond the earpiece housing. The spout may have a circular or ovaloid cross section, though the particular shape of the spout is not limiting.

In one or more exemplary earpieces, the earpiece may include a vent mechanism also denoted a vent assembly (e.g., vent system, vent configuration, vent module, vent component). The vent mechanism may be an active vent mechanism. Therefore, the vent mechanism can be configured to open and close a vent path (e.g., vent pathway, air path, sound path, fluid path, fluid communication). This may be done by moving one or more components of the vent mechanism. The vent path can pass at least partially through the earpiece housing. The vent mechanism can include any mechanical mechanism that opens and closes a vent path. In one or more exemplary earpieces, the vent mechanism may be operated electronically and/or automatically and/or manually and/or mechanically. The opening and closing of the vent mechanism may not be audible to the user.

In one or more exemplary earpieces, the vent mechanism can include a circumferential rim extending around an inner surface of the earpiece housing. The circumferential rim may be a part of the earpiece housing. The circumferential rim may be attached to the earpiece housing. The circumferential rim may form an aperture (e.g., hole, empty space, opening, gap) within the earpiece housing. The circumferential rim can include mating features.

The vent mechanism can include a plug that can move in the earpiece housing. For example, it can move longitudinally along the longitudinal axis of the earpiece. The plug can form an airtight seal with the circumferential rim when in the closed position, thus closing a vent path. When the plug is moved away from the circumferential rim, regardless of the type of motion, the vent path is opened. The plug may have a diameter greater than the inner diameter of the circumferential rim. The plug may be flat. The plug may include an extension that fits within an aperture in the circumferential rim. The plug may include corresponding mating features to mate with the mating features of the circumferential rim. The plug and/or circumferential rim may include a sealing material for improving sealing between the plug and circumferential rim.

Other vent mechanisms can be used as well, and the particular vent mechanism is not limiting. For example, the vent mechanism can include rotational components. Alternatively, the vent mechanism can include translational components. In one or more exemplary earpieces, the vent mechanism can include both rotational and translatable components.

The vent mechanism is generally used to open and close the vent path. When the vent mechanism is open, the vent mechanism allows sound to pass through the earpiece and/or earpiece housing between a proximal end and a distal end of the earpiece. When closed, the vent mechanism prevents sound from passing through the earpiece between a proximal end and a distal end of the earpiece. Thus, the vent mechanism can prevent fluid communication when closed.

This opening and closing can advantageously allow for improved sound quality when a user is listening to music. For example, the vent mechanism can be closed so that a user can experience improved bass hearing, in particular during music playback. However, this may reduce the sound received from the environment when the vent is closed.

When the user desires to hear the surrounding environment, the vent mechanism can be opened to provide audio input of the surroundings to the user. This may reduce the clarity of one or more sound levels to the user which may not be necessary or desirable for environmental hearing.

In one or more exemplary earpieces, the earpiece may include a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The set of microphones may be located partially or fully within the earpiece housing. In one or more exemplary earpieces, the set of microphones may be distal to the vent mechanism. In one or more exemplary earpieces, the set of microphones can be distal to the second set of second vent apertures. Alternatively, the set of microphones can be proximal to the second set of second vent apertures. Alternatively, the set of microphones can be aligned with the second set of second vent apertures.

Advantageously, the vent mechanism can be arranged distal to the receiver, instead of aligned with or proximal to the receiver. As the vent mechanism may need to be of a particular dimension to properly allow for the vent path, the earpiece can be constrained in size by the vent mechanism (e.g., the shrinking of the earpiece may be limited by the dimensions of the vent mechanism). However, by moving the vent mechanism distal to the receiver (e.g., farther from the ear drum), the dimensions of the earpiece housing proximal to the vent mechanism may be reduced, such as in diameter. This can improve fit with a user, especially those who have smaller ear canals, so that the earpiece can be properly held within a user's ear canal. Further, the reduction in size may allow for the earpiece to be placed further into a user's ear canal, allowing for less of the earpiece to show outside the user's ear and thus improve aesthetics.

In one or more exemplary earpieces, the earpiece housing may have two different diameters, a distal section diameter and a proximal section diameter. The proximal section diameter may be smaller than the distal section diameter. The distal section may be defined as the earpiece housing aligned with and distal to the vent mechanism. The proximal section may be defined as the earpiece housing proximal to the vent mechanism.

The distal section may be 10, 20, 30, 40, 50, 60, or 70% of a longitudinal length of the earpiece housing. The distal section may be greater than 10, 20, 30, 40, 50, 60, or 70% of a longitudinal length of the earpiece housing. The distal section may be less than 10, 20, 30, 40, 50, 60, or 70% of a longitudinal length of the earpiece housing.

The proximal section may be 10, 20, 30, 40, 50, 60, or 70% of a longitudinal length of the earpiece housing. The proximal section may be greater than 10, 20, 30, 40, 50, 60, or 70% of a longitudinal length of the earpiece housing. The proximal section may be less than 10, 20, 30, 40, 50, 60, or 70% of a longitudinal length of the earpiece housing.

For example, the proximal section diameter may be 5, 10, 15, 20, 25, 30, 35, 40, 45, or 50% smaller than the distal section diameter. The proximal section diameter may be greater than 5, 10, 15, 20, 25, 30, 35, 40, 45, or 50% of the distal section diameter. The proximal section diameter may be less than 5, 10, 15, 20, 25, 30, 35, 40, 45, or 50% of the distal section diameter.

In some embodiments, the proximal section diameter of the earpiece housing may be 0.7, 0.6, 0.5, 0.4, 0.3, 0.2, or 0.1 cm. In some embodiments, the proximal section diameter of the earpiece housing may be less than 0.7, 0.6, 0.5, 0.4, 0.3, 0.2, or 0.1 cm. In some embodiments, the proximal section diameter of the earpiece housing may be greater than 0.7, 0.6, 0.5, 0.4, 0.3, 0.2, or 0.1 cm.

In some embodiments, the distal section diameter of the earpiece housing may be 0.7, 0.6, 0.5, 0.4, 0.3, 0.2, or 0.1 cm. In some embodiments, the distal section diameter of the earpiece housing may be less than 0.7, 0.6, 0.5, 0.4, 0.3, 0.2, or 0.1 cm. In some embodiments, the distal section diameter of the earpiece housing may be greater than 0.7, 0.6, 0.5, 0.4, 0.3, 0.2, or 0.1 cm.

The change in dimension from the distal section diameter to the proximal section diameter of the earpiece housing may be in the form of a taper and/or multiple tapers (e.g., tapered). The change in dimension from the distal section diameter to the proximal section diameter may be in the form of a step and/or multiple steps (e.g., stepped). Further, the earpiece housing may include one or more steps and one or more tapers. In one or more exemplary earpieces, the earpiece housing may both reduce in diameter and increase in diameter along a length of the earpiece.

By reducing a diameter of the proximal section, this can allow for an easier fit of the earpiece into a user with a smaller ear canal. This can greatly improve the comfort and effectiveness of the hearing device. Further, the reduction in size can allow the earpiece to be place farther into the ear canal, which means less of the earpiece extends outside of the user's ear, thereby increasing aesthetics of the hearing device.

As discussed, a vent path may be formed though at least a portion of the earpiece housing. The vent path may be construed as a fluid communication path (such as for the movement of air during auditory signaling). The vent path may be open and closed via the vent mechanism as discussed above.

In one or more exemplary earpieces, the vent path can include a first set of first vent apertures (e.g., holes, empty spaces, openings, gaps). Thus, the first set of first vent apertures can provide fluid communication (e.g., a vent path) between outside the earpiece housing and inside the earpiece housing. The first set of first vent apertures can include a first primary vent aperture. The first primary vent aperture may be on the proximal end of the earpiece housing. The first primary vent aperture may be on the outer surface of the earpiece housing. The first set of first vent apertures can include one or more first vent apertures arranged on the outer surface of the earpiece housing.

The first primary vent aperture may be one or more apertures on the proximal end. Alternatively, the proximal end may be open, allowing for air to pass through the proximal end into the earpiece housing and the proximal end itself can be the first primary vent aperture. Thus, the first primary vent aperture is proximal to the vent mechanism. The first primary vent aperture may be distal to or overlapping with the receiver. The first primary vent aperture may be circular and/or ovaloid. In one or more exemplary earpieces where the receiver and/or receiver housing includes a spout, the spout can form a first part the first primary vent aperture. Alternatively, the air can enter the spout after passing through the first primary vent aperture.

In one or more exemplary earpieces, the vent path can include a second set of second vent apertures (e.g., holes, empty spaces, openings, gaps). Thus, the second set of first vent apertures can provide fluid communication (e.g., a vent path) between outside the earpiece housing and inside the earpiece housing. The second set of second vent apertures can include a second primary vent aperture. The second primary vent aperture may be distal to the vent mechanism and/or distal to the receiver. The second primary vent aperture may be circular and/or ovaloid.

The second primary vent aperture may be on the outer surface of the earpiece housing. In one or more exemplary earpieces, the outer surface can include one second primary vent aperture. In alternative earpieces, the outer surface can include a plurality of second primary vent apertures. For example, they may be spaced along an outer circumference of the outer surface. The outer surface can include multiple circumferential rows of the secondary primary vent apertures, with each row being longitudinally spaced apart. The secondary primary vent apertures maybe randomly spaced on the outer surface.

In one or more exemplary earpieces, the second set of second vent apertures, such as the second primary vent aperture, can be located on the distal end of the earpiece housing and/or distal to the vent mechanism. In one or more exemplary earpieces, the distal end can include one second primary vent aperture. In alternative earpieces, the distal end can include a plurality of second primary vent apertures.

In one or more exemplary earpieces, the second set of second vent apertures can be on the outer surface and the distal end.

Thus, in one or more exemplary earpieces, the vent path has a first set of first vent apertures comprising a first primary vent aperture on the proximal end of the earpiece housing or on the outer surface of the earpiece housing, wherein the vent path extends through the earpiece housing, and wherein the vent path has a second set of second vent apertures comprising a second primary vent aperture on the outer surface distal to the vent mechanism or on the distal end of the earpiece housing.

Accordingly, as the first set of first vent apertures are located on one (e.g. proximal) side of the vent mechanism and the second set of second vent apertures are located on an opposite (e.g. distal) side of the vent mechanism, opening and closing of the vent mechanism will open and close a vent path between the first set of first vent apertures and the second set of second vent apertures.

One or more exemplary earpieces may have a number of different vent paths that pass through the earpiece housing. The vent path may be open and closed via the vent mechanism. However, modifications can be made to the vent path to improve sound quality. For example, in a closed vent state, the low frequency sounds can have improved quality via various modifications to the earpiece.

In one or more exemplary earpieces, the receiver housing can be centered on the longitudinal axis within a cross-section of the earpiece housing. In doing so, there can be space around an outer surface of the receiver housing for air to flow through (e.g., the vent path). Thus, the vent path can extend longitudinally along all longitudinally extending surfaces of the receiver housing. Specifically, the vent path can be around/along the receiver/receiver housing.

In one or more exemplary earpieces wherein the receiver housing includes a spout, the spout can also be centered on the receiver housing. The spout can also be centered on the longitudinal axis.

However, in alternate exemplary earpieces, the receiver housing may be off-center a cross-section of the earpiece housing perpendicular to the longitudinal axis. The receiver housing may be minorly or significantly offset from the longitudinal axis. This modification may change the vent path as the air flow may not be as consistent around every surface as a centered receiver.

A longitudinal central axis of the receiver housing may be offset by 0.5, 1, 2, 3, 4, 5, or 6 mm from the longitudinal axis. A longitudinal central axis of the receiver housing may be offset by greater than 0.5, 1, 2, 3, 4, 5, or 6 mm from the longitudinal axis. A longitudinal central axis of the receiver housing may be offset by less than 0.5, 1, 2, 3, 4, 5, or 6 mm from the longitudinal axis.

When the receiver housing is offset from the longitudinal axis, if a spout is used the spout may be centered on the receiver housing. Thus, the spout may be offset from the longitudinal axis. Alternatively, the spout may be centered on the longitudinal axis, and thus may be offset from a center of the receiver housing.

A longitudinal central axis of the spout may be offset by 0.5, 1, 2, 3, 4, 5, or 6 mm from the center of the receiver housing. A longitudinal central axis of the spout may be offset by greater than 0.5, 1, 2, 3, 4, 5, or 6 mm from the center of the receiver housing. A longitudinal central axis of the spout may be offset by less than 0.5, 1, 2, 3, 4, 5, or 6 mm from the center of the receiver housing.

In one or more exemplary earpieces, the receiver housing may be offset sufficiently to contact the earpiece housing. In one or more exemplary earpieces, the receiver housing may have an outer surface. The outer surface may be adjacent to and in contact with an inner surface of the earpiece housing. Thus, air is prevented from flowing along the receiver surface associated with and/or in contact with the earpiece housing. In one or more exemplary earpieces, the receiver housing may have multiple outer surfaces adjacent to and in contact with an inner surface of the earpiece housing. The receiver housing may have an outer surface(s) which may be sized and/or configured to conform with an inner surface(s) of the earpiece housing.

In one or more exemplary earpieces, there may be a first distance and/or a first area and/or first volume between a first side wall of the receiver housing and the earpiece housing adjacent the first side wall. Further, there may be a second distance and/or a second area and/or second volume between a second side wall of the receiver housing and the earpiece housing adjacent the second side wall. The second side wall may be opposite the first side wall. In a centered receiver housing, the first distance and/or the first area and/or the first volume would be the same as the second distance and/or the second area and/or the second volume. In an off center receiver housing, the first distance and/or the first area and/or the first volume is larger than the second distance and/or the second area and/or the second volume. In an off center receiver housing, the second distance and/or the second area and/or the second volume is larger than the first distance and/or the first area and/or the first volume.

For example, the first distance and/or the first area and/or the first volume may be 5, 10, 15, 20, 25, 30, 35, 40, 45, 50, 55, 60, 65, or 75% larger than the respective second distance and/or the second area and/or the second volume. The first distance and/or the first area and/or the first volume may be greater than 5, 10, 15, 20, 25, 30, 35, 40, 45, 50, 55, 60, 65, or 75% larger than the respective second distance and/or the second area and/or the second volume. The first distance and/or the first area and/or the first volume may be less than 5, 10, 15, 20, 25, 30, 35, 40, 45, 50, 55, 60, 65, or 75% larger than the respective second distance and/or the second area and/or the second volume.

In one or more exemplary earpieces, there may be a third distance and/or third area and/or third volume between a third side wall of the receiver housing and the earpiece housing adjacent the third side wall. In one or more exemplary earpieces, there may be a fourth distance and/or fourth area and/or fourth volume between a fourth side wall of the receiver housing and the earpiece housing adjacent the fourth side wall. Based on the centering of the receiver housing, the measurements of the distances/areas/volumes may vary.

There could be additional distances/areas/volumes between the receiver housing and the earpiece housing.

Discussed above are one or more exemplary earpieces which include a vent path passing through a proximal end of the earpiece housing. However, alternate vent paths can be used. It will be understood that some or all of the above components (e.g., receivers, vent mechanism) can be incorporated into alternative vent path embodiments as discussed below.

For example, in one or more exemplary earpieces, instead of having the vent path pass through the proximal end of the earpiece housing, the first set of first vent apertures may be located in a different place on the receiver housing. As before, the first set of first vent apertures can include a first primary vent aperture on the outer surface of the earpiece housing. Specifically, the first set of first vent apertures can be in the outer surface of the earpiece housing.

The first primary vent aperture can be proximal to the vent mechanism. In one or more exemplary earpieces, the first set of first vent apertures are located distal to the receiver. In one or more exemplary earpieces, the first set of first vent apertures are located proximal to the receiver. In one or more exemplary earpieces, the first set of first vent apertures are aligned with to the receiver. In one or more exemplary earpieces, some of the first set of first vent apertures are proximal to the receiver and some are aligned with the receiver. In one or more exemplary earpieces, some of the first set of first vent apertures are proximal to the receiver and some are distal to the receiver. In one or more exemplary earpieces, some of the first set of first vent apertures are distal to the receiver and some are aligned with the receiver. In one or more exemplary earpieces, some of the first set of first vent apertures are proximal to the receiver, some are aligned with the receiver, and some are distal to the receiver.

In one or more exemplary earpieces, the outer surface can include one first primary vent aperture. In alternative earpieces, the outer surface can include a plurality of first primary vent apertures. For example, they may be spaced along an outer circumference of the outer surface. The outer surface can include multiple circumferential rows of the first primary vent apertures, with each row being longitudinally spaced apart. The first primary vent apertures maybe randomly spaced on the outer surface.

Thus, the proximal end may not include one or more of the first set of first vent apertures (e.g., be closed). However, the proximal end may include an aperture for passing air through a spout into the receiver.

In one or more exemplary earpieces, the first set of first apertures can include a primary vent aperture on the proximal end of the earpiece housing and on the outer surface. Thus, air can enter/exit the earpiece housing from multiple directions proximal to the vent mechanism.

Similar to above, the vent path can include a second set of second vent apertures. Thus, the second set of first vent apertures can provide fluid communication (e.g., a vent path) between outside the earpiece housing and inside the earpiece housing. The second set of second vent apertures can include a second primary vent aperture. The second primary vent aperture may be distal to the vent mechanism. The second primary vent aperture may be circular and/or ovaloid.

The second primary vent aperture may be on the outer surface of the earpiece housing. In one or more exemplary earpieces, the outer surface can include one second primary vent aperture. In alternative earpieces, the outer surface can include a plurality of second primary vent apertures. For example, they may be spaced along an outer circumference of the outer surface. The outer surface can include multiple circumferential rows of the secondary primary vent apertures, with each row being longitudinally spaced apart. The secondary primary vent apertures maybe randomly spaced on the outer surface.

In one or more exemplary earpieces, the second set of second vent apertures can be located on the distal end of the earpiece housing. In one or more exemplary earpieces, the distal end can include one second primary vent aperture. In alternative earpieces, the distal end can include a plurality of second primary vent apertures.

In one or more exemplary earpieces, the second set of second vent apertures can be on the outer surface and the distal end. Thus, air can enter/exit the earpiece housing from multiple directions distal to the vent mechanism.

Thus, in one or more exemplary earpieces, the vent path has a first set of first vent apertures comprising a first primary vent aperture on the outer surface of the earpiece housing proximal to the vent mechanism and distal to the receiver, the vent path extends through the earpiece housing, and the vent path has a second set of second vent apertures comprising a second primary vent aperture on the outer surface distal to the vent mechanism.

In any of the above-discussed exemplary earpieces, the earpiece can include one or more domes (e.g., circle, oval, skirts, cones, holders, fitters) extending radially away from the outer surface of the earpiece housing. The one or more domes may extend partially or fully around an outer circumference of the earpiece housing and/or components extending from the earpiece housing. The one or more domes can be integrally formed with the earpiece housing and/or components extending from the earpiece housing. Alternatively, the one or more domes can be attached to the earpiece housing and/or components extending from the earpiece housing. For example, they can be attached to the outer surface. Alternatively, they can be attached to the proximal end and/or the distal end. Alternatively, they can be attached to the outer surface and/or the distal end and/or the proximal end. The one or more domes may extend proximally and/or distally beyond the earpiece housing and/or components extending from the earpiece housing.

The one or more domes may be flexible. The one or more domes may be rigid. The one or more domes may be formed from plastic and/or silicone. The one or more domes may be configured to press against an inner surface of a user's ear canal. The one or more domes can conform to a user's ear canal. Thus, the one or more domes may provide a fit for an earpiece in the user's ear canal. This can prevent unwanted motion of the earpiece within the owner's ear. The one or more domes may be generally circular and/or ovaloid in cross-sectional shape. In one or more exemplary earpieces, the one or more domes can be conically formed, such as opening in a proximal direction. In one or more exemplary earpieces, the one or more domes can be conically formed, such as opening in a distal direction.

In one or more exemplary earpieces, the earpiece can include a first dome (e.g., first skirt or first cone). The first dome can be located proximal to the first set of first vent apertures. The first dome can help to secure the earpiece in the ear canal. The first dome can have an inner surface. The inner surface can extend circumferentially along the outer surface of the earpiece housing. Thus, the first dome can be connected to the earpiece housing. Alternatively, the first dome may be integrally formed with the earpiece housing.

In one or more exemplary earpieces, the first dome has a vent aperture. The vent aperture can be through the first dome for provision of fluid communication. For example, the vent aperture can be through a longitudinal thickness of the first dome. Thus, the vent aperture can provide for provision of fluid communication between a proximal side and a distal side of the first dome. In alternative variations, the first dome can have a plurality of vent apertures, for example, 2, 3, 4, 5, 6 vent apertures. The plurality of vent apertures may be spaced around the first dome. The plurality of vent apertures may be asymmetrically spaced around the first dome. The plurality of vent apertures may be symmetrically spaced around the first dome. Advantageously, the use of the dome with one or more vent apertures can provide for a larger air volume than what would be found in the earpiece housing. Thus, sound quality of the hearing device can be improved.

The vent aperture may have the same dimensions through the thickness of the first dome. Alternatively, the vent aperture may vary in dimensions throughout the thickness of the first dome.

The vent aperture can be particularly advantageous when the first set of first vent apertures are located on the outer surface of the earpiece housing.

Alternatively, the first dome may not have any vent apertures. This can be advantageous for when the first set of first vent apertures are located on the proximal end of the earpiece housing. In this variation, the first dome may be located distal to the first set of first vent apertures.

In one or more exemplary earpieces, the earpiece can further include a second dome (e.g., second skirt or second cone). The second dome can be located distal to the first dome. The second dome can assist in securing the earpiece in the ear canal. The second dome can have an inner surface extending circumferentially along the outer surface of the earpiece housing. Thus, the second dome can be connected to the earpiece housing. Alternatively, the second dome may be integrally formed with the earpiece housing.

The second dome may prevent fluid communication across a longitudinal thickness of the second dome. Thus, the second dome may not include a vent aperture, or any other aperture providing fluid communication across the second dome. Specifically, the second dome can prevent fluid communication between a proximal side and a distal side of the second dome between the outer surface of the earpiece housing and an ear canal surface.

In one or more exemplary earpieces, the second dome can be located distal to the first set of first vent apertures. In one or more exemplary earpieces, the second dome can be located proximal to the second set of second vent apertures. In one or more exemplary earpieces, the second dome can be located longitudinally between the first primary vent aperture (or the first set of first vent apertures) and the second primary vent apertures (or the second set of second primary vent apertures). Thus, opening and closing of the vent mechanism can prevent fluid flow through or around the earpiece for improving sound quality.

The second dome can have a larger dimension extending away from the earpiece housing than the first dome. The second dome can have the same extension away from the earpiece housing as the first dome. The second dome can extend away from the earpiece housing in a dimension less than the first dome. For example, if the second dome was located on the distal section and the first dome was located on the proximal section, and the distal section had a diameter greater than the proximal section, the first dome would need to have a greater dimension than the second dome.

In one or more exemplary earpieces, the first dome and the second dome are separate.

In certain variations, both the first dome and the second dome prevent fluid flow through the domes. Thus, the first set of first vent apertures can be on the proximal end of the earpiece housing as discussed above.

In one or more exemplary earpieces, the first dome and the second dome can be connected, thereby forming a combined dome. For example, the first dome and the second dome can be connected by a cylindrical part.

In one or more exemplary earpieces, a combined dome can include multiple dome parts, such as a first dome part and a second dome part. The combined dome can include further dome parts as well, such as a third, fourth, or fifth dome part. The first dome part can be proximal to the second dome part. The first dome part may overlap the second dome part in the longitudinal direction. The first dome part may not overlap the second dome part in the longitudinal direction.

The first dome part and the second dome part can be connected to one another via a connection (e.g., connection surface, connection part). In one or more exemplary earpieces, the first dome part and the second dome part and the connection can be one integral unit. The connection may vary in size depending on the earpiece housing, thereby changing the spacing between the first dome part and the second dome part. In one or more exemplary earpieces, the connection may generally conform around the outer surface of the earpiece housing. The connection may be generally cylindrical. The connection may include a step or a taper to conform with a stepped or tapered earpiece housing. The connection may generally conform with the earpiece housing.

The combined dome can assist in securing the earpiece in the ear canal, such as being pressed against an inner surface of the user's ear canal. The combined dome can have an inner surface extending circumferentially along the outer surface of the earpiece housing. Thus, the combined dome can be connected to the earpiece housing. Alternatively, the combined dome may be integrally formed with the earpiece housing.

In one or more exemplary earpieces, the first dome part has a first dome part vent aperture. The first dome part vent aperture can be through the first dome part for provision of fluid communication. For example, the first dome part vent aperture can be through a longitudinal thickness of the first dome part. Thus, the first dome part vent aperture can provide for provision of fluid communication between a proximal side and a distal side of the first dome part. In alternative variations, the first dome part can have a plurality of first dome part vent apertures, for example, 2, 3, 4, 5, 6 vent apertures. The plurality of first dome part vent apertures may be spaced around the first dome part. The plurality of first dome part vent apertures may be asymmetrically spaced around the first dome part. The plurality of first dome part vent apertures may be symmetrically spaced around the first dome part. Advantageously, the use of the first dome part with one or more first dome part vent apertures can provide for a larger air volume than what would be found in the earpiece housing. Thus, sound quality of the hearing device can be improved.

The first dome part vent aperture may have the same dimensions through the thickness of the first dome part. Alternatively, the first dome part vent aperture may vary in dimensions throughout the thickness of the first dome part.

The first dome part vent aperture can be particularly advantageous when the first set of first vent apertures are located on the outer surface of the earpiece housing.

Alternatively, the first dome part may not have a first dome part vent aperture. This can be advantageous for when the first set of first vent apertures are located on the proximal end of the earpiece housing. In this variation, the first dome part may be located distal to the first set of first vent apertures.

In one or more exemplary earpieces, the combined dome can include a connection vent in the connection between the first dome part and the second dome part. This provides a fluid connection between the space between the first dome part and the second dome part and an inner volume of the combined dome (e.g., between radially outside the connection and radially inside the connection). This connection vent can be aligned with, for example, the first set of first vent apertures as discussed above, providing a fluid connection into an earpiece housing. Thus, the vent path can pass through the first dome part vent aperture into the volume between the first dome part and the second dome part and through the connection vent to reach an inner volume of the earpiece housing.

In certain variations, both the first dome part and the second dome part prevent fluid flow through the domes. Thus, the first set of first vent apertures can be on the proximal end of the earpiece housing as discussed above.

The hearing device may be configured for wireless communication with one or more devices, such as with another hearing device, e.g. as part of a binaural hearing system, and/or with one or more accessory devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source (s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device and/or earpiece optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device and/or earpiece may comprise a plurality of antennas and/or an antenna may be configured to be operate in one or a plurality of antenna modes. The transceiver input signal optionally comprises a first transceiver input signal representative of the first wireless signal from a first external source.

The hearing device and/or earpiece optionally comprises a pre-processing unit. The pre-processing unit may be connected to the radio transceiver for pre-processing the transceiver input signal. The pre-processing unit may be connected the first microphone for pre-processing the first microphone input signal. The pre-processing unit may be connected the second microphone if present for pre-processing the second microphone input signal. The pre-processing unit may comprise one or more A/D-converters for converting analog microphone input signal(s) to digital pre-processed microphone input signal(s).

The hearing device and/or earpiece comprises a processor for processing input signals, such as pre-processed transceiver input signal and/or pre-processed microphone input signal(s). The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

FIG. 1A shows an exemplary earpiece for a hearing device. The earpiece 100 can be inserted into an ear canal of a user and can have a longitudinal axis 101. As shown, the earpiece 100 can include an earpiece housing 102, which can form a body of the earpiece 100. The earpiece housing 102 can include one or more inlets/outlets which can allow air to flow through the earpiece 100 as discussed in detail above, thereby providing for fluid communication. Further, the earpiece housing 102 can include a distal end 104 and a proximal end 106, which can be connected by an outer surface 108. The proximal end 106 is nearest to the ear drum 50. The outer surface 108 can be shaped as shown in FIG. 1A, but may also be a number of different shapes as discussed in detail above. For example, the outer surface 108 can extend along the longitudinal axis 101.

One component that may be contained within the earpiece housing 102 is the receiver 120. The receiver 120 can be surrounded by a receiver housing 122. In one or more exemplary earpieces, the receiver 120 can also include a spout 128 for directing audio waves. The spout 128 can extend proximally away from the receiver housing 122 towards the ear drum 50 and provide fluid communication to the receiver 120. Another component within the earpiece housing 102 can be the microphone 118. The microphone 118 can be distal of the vent mechanism 150, as shown.

Further, the earpiece housing 102 can contain a vent mechanism 150. As shown, the vent mechanism 150 can be located distal to the receiver 120 and/or receiver housing 122. The vent mechanism 150 can be formed from a number of components, for example a plug 154 configured to fit within a circumferential rim 152. The plug 154 can translate away from and towards the circumferential rim, thereby being configured to open and close a vent path 130 inside the earpiece housing 102.

The vent path 130 can include a first set of first vent apertures 114 including a first primary vent aperture. As shown, the first primary vent aperture can be on the proximal end 106 of the earpiece housing 102 (e.g., the proximal end of the earpiece housing 102 has an opening). The vent path 130 can then extend through the earpiece housing 102, such as shown in FIG. 1A. If the vent mechanism 150 is open, the vent path 130 can pass through the vent mechanism 150 and into a distal section of the earpiece housing 102. The vent path 130 can include a second set of second vent apertures 110, which can include a second primary vent aperture. As shown, the second set of second vent apertures 110 can be on the outer surface 108 of the earpiece housing 102 distal to the vent mechanism 150. However, if the vent mechanism 150 was closed, the vent path 130 through the earpiece housing 102 would be shut off.

Figure 1B:
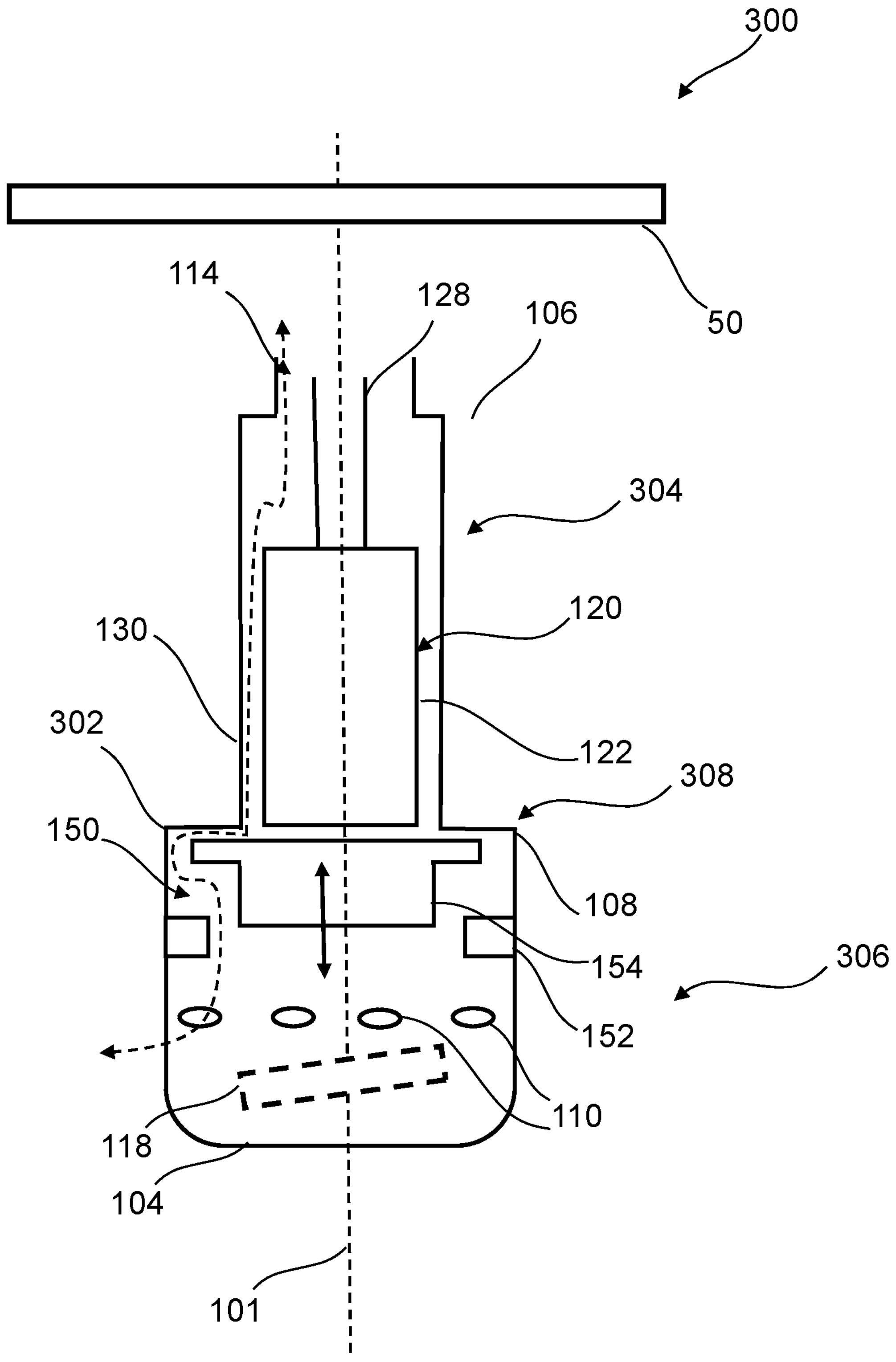

While FIG. 1A illustrates an earpiece housing 102 with the same radial diameter, FIG. 1B illustrates an earpiece 300 with an earpiece housing 302 with a varying radial diameter as discussed above. As shown, the earpiece housing 302 and/or outer surface 108 can have a proximal section 304 and a distal section 306. The proximal section 304 does not include the vent mechanism 150, and thus may have a reduced diameter as compared to the distal section 306. Thus, fit can be improved, especially for user's with smaller ear canals. Further, while a step 308 is shown in FIG. 1B, a taper could be used as well.

FIGS. 2A-2B show example vent paths of one or more earpieces of a hearing device, such as earpiece 100. As shown, the earpiece housing 102 can have a circular (FIG. 2A) or ovaloid (FIG. 2B) cross-section perpendicular to the longitudinal axis 101. The receiver/receiver housing 120/122 can be centered on the longitudinal axis 101 within a cross-section of the earpiece housing 102. Thus, the vent path 130 can pass around an outside of the receiver housing 122, such as shown. Depending on the shape of the earpiece housing 102, the vent path may differ around the receiver housing 122. For example, as shown in FIGS. 2A-2B, the vent path 130 extends longitudinally along all longitudinally extending surfaces of the receiver housing 102.

FIG. 3 shows an alternate exemplary earpiece for a hearing device. The earpiece 100 of FIG. 3 can include all of the components discussed above with respect to FIGS. 1A-1B, but certain components such as the vent mechanism 150 and microphone 118 have been removed for convenience of viewing. As shown, instead of the centered receiver 120 discussed with respect to FIGS. 2A-2B, the receiver housing 122 may instead be off-center a cross-section of the earpiece housing 102 perpendicular to the longitudinal axis 101. Further, the spout 128 can be off-center of the receiver housing 122. This allows for a different vent path 130 that may not go around every longitudinally extending surface of the receiver housing 122.

For example, as shown the receiver housing may have an outer surface 124 that is adjacent to and in contact with an inner surface 126 of the earpiece housing 102. Thus, air would not be able to pass along that surface for the vent path 130, or would at least be greatly reduced. By varying the vent path 130, low frequency sounds may have improved quality. In an open vent state, absence of low frequencies may contribute to an improved open fitting (no occlusion).

As the receiver housing 122 can be offset from longitudinal axis 101, in a symmetrical earpiece housing 102, there will be different amounts of distance/volume/area between an outer surface of the receiver housing 122 and an inner surface of the earpiece housing 102. Thus, as shown in FIG. 3, there is more distance/volume/area between a top of the receiver housing 122 and the earpiece housing 102 as compared to the distance/volume/area between a bottom of the receiver housing 122 and the earpiece housing 102 (for example between outer surface 124 and inner surface 126).

Figure 4:
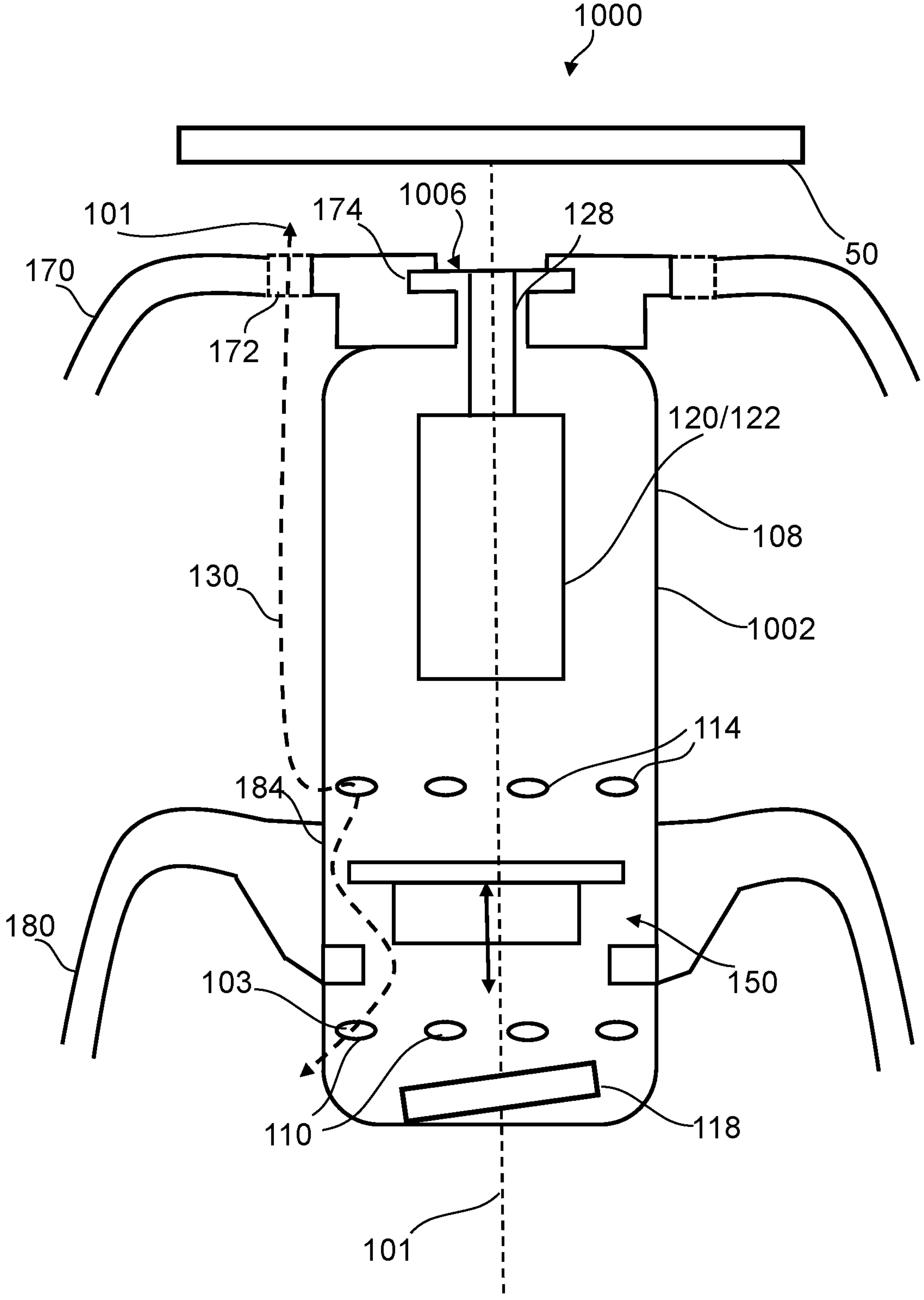

FIG. 4 shows an alternate exemplary earpiece for a hearing device. Unless otherwise noted, the earpiece 1000 can include the same features as discussed above with respect to FIGS. 1-3.

As shown in FIG. 4, the vent path 130 may be modified as there are no first set of first apertures located on the proximal end of the earpiece housing 1002. Instead, the proximal end 1006 may be closed, except where the spout 128 directs air flow into the receiver/receiver housing 120/122. Thus, the vent path 130 does not come from the proximal end 1006 of the earpiece 1000.

As shown, the first set of first apertures 114 can be located on the outer surface 108 of the earpiece housing 1000. They can be located proximal to the vent mechanism 150, while the second set of first apertures 110 can remain in their previously discussed position distal to the vent mechanism 150. Thus, the vent path 130 can be from outside the earpiece housing 1002, through the first set of first vent apertures 114 on the outer surface 108 of the earpiece housing 1002, proximal to the vent mechanism 150, can pass through the vent mechanism 150, and then can exit the earpiece housing 1002 via the second set of second vent apertures 110 located on the outer surface 108 distal to the vent mechanism 150. Similar to above, the vent mechanism 150 can be opened or closed to open and close the vent path 130.

Further, FIG. 4 shows a first dome 170 located proximal to the first set of first vent apertures 114. The first dome 170 can be incorporated into the earpieces discussed in FIGS. 1A-3 as well. The first dome 170 can be used to secure the earpiece 1000 into the ear canal by pressing and sealing against the ear canal. The first dome 170 can include an inner surface 174 which can extend circumferentially along the outer surface 108 of the earpiece housing 1002. This inner surface 174 can help attach the first dome 170 to the earpiece housing 1002, or a component of the earpiece housing 1002.

The first dome 170 can further include a vent aperture 172 extending longitudinally through the first dome 170. This can provide for provision of fluid communication between a proximal side and a distal side of the first dome 170. Thus, the vent path 130 can pass through the vent aperture 172 from the ear drum 50 through the first set of first vent apertures 114 into the earpiece housing 1002, through the vent mechanism 150, and out the second set of second vent apertures 110.

FIG. 4 additionally shows a second dome 180 located distal to the first dome 170. The second dome 180 can be incorporated into the earpieces discussed in FIGS. 1A-3 as well. The second dome 180 can advantageously secure the earpiece 1000 tin the ear canal. The second dome 180 can include an inner surface 184 extending circumferentially along the outer surface 108 of the earpiece housing 1002. Unlike the first dome 170, the second dome 180 prevents fluid communication between a proximal side and a distal side of the second dome 180 between the outer surface of the earpiece housing an and ear canal surface.

Figure 5:
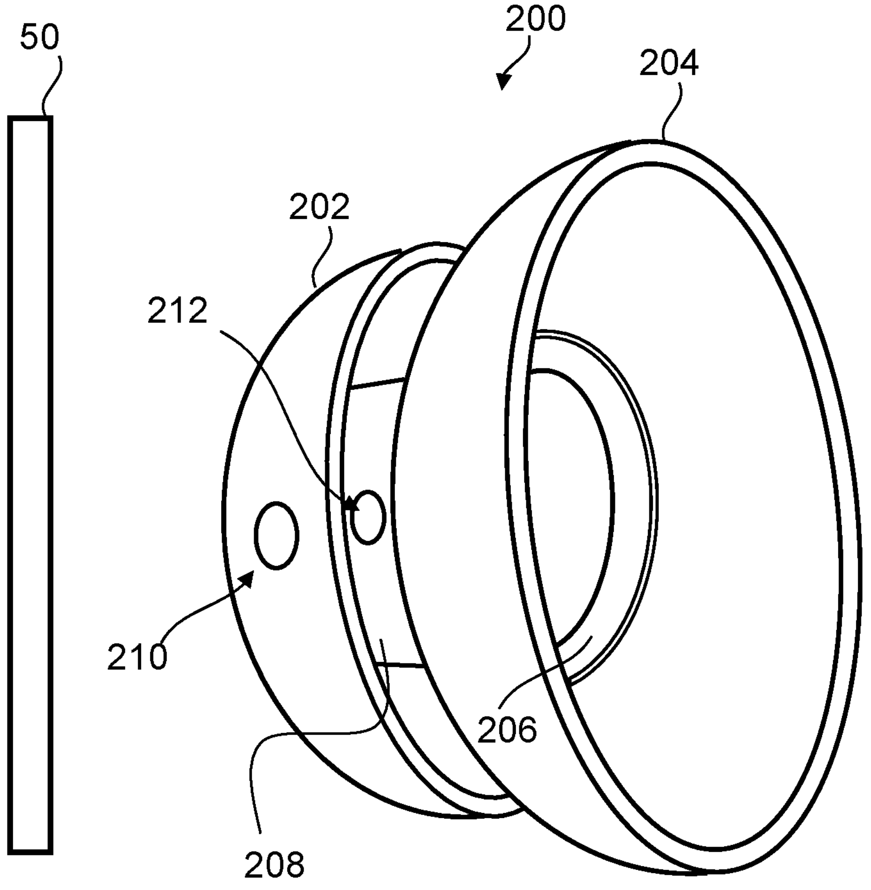
FIG. 5 illustrates an exemplary dome for hearing device.

FIG. 5 shows an alternatively exemplary dome for a hearing device. Unlike the first dome 170 separated from the second dome 180 as discussed with respect to FIG. 4, the earpiece can instead use a combined dome 200. The combined dome 200 can be incorporated into the earpieces discussed in FIGS. 1A-3 as well. The combined dome 2000 can include multiple dome parts, such as the first dome part 202 and the second dome part 204. The first dome part 202 can be proximal to the second dome part 204. The first dome part 202 and second dome part 204 can be connected to one another via a connection 208. Thus, the first dome part 202 and the second dome part 204 can be one integral unit.

Further, the combined dome 200 can include an inner surface 206. The inner surface 206 can extend circumferentially along the outer surface 108 of the earpiece housing 102/1002, thereby connecting the combined dome 200 to the earpiece 100/1000.

As shown, the first dome part 202 can include a vent aperture 210 for allowing air to pass through from a proximal end to a distal end of the first dome part. This can be similar to first dome 170. The second dome part 204 may prevent air from passing through the second dome part 204, acting similar to second dome 180.

The combined dome 200 can further include a connection vent 212 in the connection 208 between the first dome part 202 and the second dome part 204. This provides a fluid connection between the space between the first dome part 202 and the second dome part 204, and an inner volume of the combined dome 200. This connection vent 212 can be aligned with, for example, the first set of first vent apertures 114 as discussed above, providing a fluid connection into an earpiece housing 102/1002. Thus, the vent path 130 can pass through vent aperture 210 into the volume between the first dome part 202 and the second dome part 204 and through the connection vent 212 to reach an inner volume of the earpiece housing 102/1002.

Alternatively, the combined dome 200 may have no vent apertures or connection vents.

Examples of hearing devices and/or earpieces for hearing devices according to the disclosure are set out in the following items:

Item 1. An earpiece of hearing device for insertion into an ear canal of a user and having a longitudinal axis, the earpiece comprising:

- an earpiece housing having a distal end, a proximal end, and an outer surface connecting the distal end to the proximal end;
- a receiver comprising a receiver housing, the receiver located within the earpiece housing; and
- a vent mechanism arranged in the earpiece housing, wherein the vent mechanism is arranged distal to the receiver.

Item 2. Earpiece according to Item 1, wherein the vent mechanism is configured to open and close a vent path inside the earpiece housing.

Item 3. Earpiece according to Item 2, wherein the vent path has a first set of first vent apertures comprising a first primary vent aperture on the proximal end of the earpiece housing, wherein the vent path extends through the earpiece housing, and wherein the vent path has a second set of second vent apertures comprising a second primary vent aperture on the outer surface distal to the vent mechanism.

Item 4. Earpiece according to any one of the preceding Items, wherein the outer surface extends along the longitudinal axis.

Item 5. Earpiece according to any one of the preceding Items, wherein the earpiece housing has a circular and/or ovaloid and/or rectangular cross section perpendicular to the longitudinal axis.

Item 6. Earpiece according to any one the preceding Items, wherein the receiver housing is off-center a cross-section of the earpiece housing perpendicular to the longitudinal axis.

Item 7. Earpiece according to Item 6, wherein the receiver housing has an outer surface adjacent to and in contact with an inner surface of the earpiece housing.

Item 8. Earpiece according to any one of Items 6-7, wherein a first distance and/or first area between a first side wall of the receiver housing and the earpiece housing adjacent the first side wall is larger than a second distance and/or second area between a second side wall of the receiver housing and the earpiece housing adjacent the second side wall, wherein the second side wall is opposite the first side wall.

Item 9. Earpiece according to any one of Items 1-5, wherein the receiver housing is centered on the longitudinal axis within a cross-section of the earpiece housing.

Item 10. Earpiece according to Item 9, wherein the vent path extends longitudinally along all longitudinally extending surfaces of the receiver housing.

Item 11. Earpiece according to Item 2, wherein the vent path has a first set of first vent apertures comprising a first primary vent aperture on the outer surface of the earpiece housing proximal to the vent mechanism and distal to the receiver, the vent path extends through the earpiece housing, and the vent path has a second set of second vent apertures comprising a second primary vent aperture on the outer surface distal to the vent mechanism.

Item 12. Earpiece according to Item 11, wherein the earpiece further comprises:

a first dome located proximal to the first set of first vent apertures for securing the earpiece in the ear canal, wherein the first dome has an inner surface extending circumferentially along the outer surface of the earpiece housing;

wherein the first dome has a vent aperture through the first dome for provision of fluid communication between a proximal side and a distal side of the first dome.

Item 13. Earpiece according to Item 12, wherein the earpiece further comprises:

a second dome located distal to the first dome for securing the earpiece in the ear canal, wherein the second dome has an inner surface extending circumferentially along the outer surface of the earpiece housing;

wherein the second dome prevents fluid communication between a proximal side and a distal side of the second dome between the outer surface of the earpiece housing and an ear canal surface.

Item 14. Earpiece according to Item 13, wherein the second dome is located longitudinally between the first primary vent aperture and the second primary vent aperture.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1A-5 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

50 ear drum
100, 300, 1000 earpiece
101 longitudinal axis
102, 302, 1002 earpiece housing
104 distal end
106 proximal end
108 outer surface
110 second set of second vent apertures
114 first set of first vent apertures
118 microphone
120 receiver
122 receiver housing
124 outer surface
126 inner surface
128 spout
130 vent path
150 vent mechanism
152 circumferential rim
154 plug
170 first dome
172 vent aperture
174 inner surface
180 second dome
184 inner surface
200 combined dome
202 first dome part
204 second dome part
206 inner surface
208 connection
210 vent aperture
212 connection vent
304 proximal section
306 distal section
308 step

The invention claimed is:

1. An earpiece configured for insertion into an ear canal of a user, the earpiece comprising:

an earpiece housing having a distal end, a proximal end, and an outer surface extending between the distal end and the proximal end;

a receiver comprising a receiver housing, the receiver located within the earpiece housing; and a vent mechanism in the earpiece housing, wherein the vent mechanism is distal to the receiver, wherein the vent mechanism is configured to open and close a vent path, wherein the earpiece comprises a first aperture at the earpiece housing, and wherein the first aperture is associated with the vent path.

2. The earpiece according to claim 1, wherein the vent path is at least partly in the earpiece housing.

3. The earpiece according to claim 2, wherein the vent path extends through the earpiece housing, and wherein the earpiece has a second aperture on the outer surface of the earpiece housing, the second aperture being distal to the vent mechanism.

4. The earpiece according to claim 1, wherein the outer surface extends along a longitudinal axis of the earpiece.

5. The earpiece according to claim 1, wherein the earpiece housing has a circular cross section, and/or an ovaloid cross section, and/or a rectangular cross section perpendicular to a longitudinal axis of the earpiece.

6. The earpiece according to claim 1, wherein the receiver housing is off-centered with respect to a longitudinal axis of the earpiece.

7. The earpiece according to claim 1, wherein the receiver housing has an outer surface in contact with an inner surface of the earpiece housing.

8. The earpiece according to claim 1, wherein a first distance and/or first area between a first side wall of the receiver housing and a first side wall of the earpiece housing, is larger than a second distance and/or second area between a second side wall of the receiver housing and a second side wall of the earpiece housing, wherein the second side wall of the receiver housing is opposite the first side wall of the receiver housing, and wherein the second side wall of the earpiece housing is opposite the first side wall of the earpiece housing.

9. The earpiece according to claim 1, wherein the receiver housing is closer to a first side wall of the receiver housing than to a second side wall of the receiver housing, the second side wall being opposite from the first side wall.

10. The earpiece according to claim 1, wherein the receiver housing is centered with respect to a longitudinal axis of the earpiece.

11. The earpiece according to claim 1, wherein the first aperture is proximal to the vent mechanism.

12. The earpiece according to claim 1, wherein at least a part of the vent path is defined by a surface of the receiver housing.

13. The earpiece according to claim 12, wherein the at least a part of the vent path extends longitudinally along a longitudinal surface of the receiver housing.

14. The earpiece according to claim 1, wherein the first aperture is on the outer surface of the earpiece housing proximal to the vent mechanism and distal to the receiver.

15. The earpiece according to claim 1, further comprising a second aperture distal to the vent mechanism.

16. The earpiece according to claim 15, wherein the second aperture is closer to the distal end of the earpiece housing than to the proximal end of the earpiece housing.

17. The earpiece according to claim 1, further comprising a microphone, wherein the microphone is distal to the receiver.

18. The earpiece according to claim 1, further comprising a plurality of additional apertures that are closer to the distal end of the earpiece housing than to the proximal end of the earpiece housing.

19. The earpiece according to claim 1, wherein the first aperture is at the proximal end of the earpiece housing.

20. The earpiece according to claim 1, wherein the vent path allows venting outside multiple sides of the receiver housing.

21. The earpiece of claim 1, wherein the vent path is at least partly in the earpiece housing;

wherein the first aperture is on the outer surface of the earpiece housing, and wherein the first aperture is between the distal end and the proximal end of the earpiece housing;

wherein the earpiece further comprises a first dome located proximal to the first aperture, wherein the first dome circumferentially surrounds a longitudinal axis of the earpiece housing; and wherein the first dome has a wall and a vent aperture extending through a thickness of the wall of the first dome.

22. An earpiece configured for insertion into an ear canal of a user, the earpiece comprising:

an earpiece housing having a distal end, a proximal end, and an outer surface extending between the distal end and the proximal end;

a receiver comprising a receiver housing, the receiver located within the earpiece housing; and a vent mechanism in the earpiece housing, wherein the vent mechanism is distal to the receiver;

wherein the vent mechanism is configured to open and close a vent path that is at least partly in the earpiece housing; and wherein the earpiece has a first aperture on the outer surface of the earpiece housing, and wherein the first aperture is between the distal end and the proximal end of the earpiece housing;

wherein the earpiece further comprises a first dome located proximal to the first aperture, wherein the first dome circumferentially surrounds a longitudinal axis of the earpiece housing; and wherein the first dome has a wall and a vent aperture extending through a thickness of the wall of the first dome.

23. The earpiece according to claim 22, further comprising a second dome located distal to the first dome.

24. The earpiece according to claim 23, wherein the second dome is configured to prevent fluid communication between a proximal side and a distal side of the second dome.

25. The earpiece according to claim 23, wherein the earpiece has a second aperture, and wherein the second dome is at a longitudinal position that is between a first longitudinal position of the first aperture and a second longitudinal position of the second aperture.

* * * * *